United States Patent [19]

Gerstle et al.

[11] Patent Number: 4,957,380

[45] Date of Patent: Sep. 18, 1990

[54] TAB ADJUST FUNCTION FOR AN ELECTRONIC TYPEWRITER TO PERMIT THE SHIFTING OF TABS FROM A FIRST TO A SECOND FORMAT

[75] Inventors: Patrick J. Gerstle, Nicholasville, Ky.; Mac A. Mathis, Austin, Tex.; David R. Smith; Kathryn R. Stilz, both of Lexington, Ky.

[73] Assignee: International Business Machines Corporation, Armonk, N.Y.

[21] Appl. No.: 167,810

[22] Filed: Mar. 14, 1988

[51] Int. Cl.$^5$ .............................................. B41J 21/17
[52] U.S. Cl. ...................................... 400/279; 400/76; 400/284
[58] Field of Search .................. 400/63, 64, 70, 161.1, 400/279, 705.1, 705.4, 284

[56] References Cited

U.S. PATENT DOCUMENTS

| | | | |
|---|---|---|---|
| 3,330,398 | 7/1967 | Hylan | 400/161.1 X |
| 3,493,090 | 2/1970 | Liles | 400/161.1 |
| 4,031,996 | 6/1977 | Busch | 400/279 |
| 4,086,660 | 4/1978 | McBride | 400/279 X |
| 4,131,949 | 12/1978 | Fletcher et al. | 400/64 X |
| 4,169,685 | 10/1979 | Gruber | 400/705.4 |
| 4,212,553 | 7/1980 | Acosta et al. | 400/76 X |
| 4,350,455 | 9/1982 | Moore et al. | 400/279 |

FOREIGN PATENT DOCUMENTS 2185136 7/1987 United Kingdom .................. 400/76

OTHER PUBLICATIONS

IBM Technical Disclosure Bulletin, "Format Control Functions", Adam et al., vol. 25, No. 1, Jun. 1982, pp. 217–220.
IBM Technical Disclosure Bulletin, "Fixed and Floating Tab Stops Stored in One Tab Rack", Daniels et al., vol. 26, No. 78, Dec. 1983, p. 3920.

Primary Examiner—David A. Wiecking
Attorney, Agent, or Firm—Laurence R. Letson

[57] ABSTRACT

A typewriter may store a document in a first format with margins and tab stop locations defined for a first format and then the operator may change the margin or tabs to a second format. The operator may also select whether the tab stop locations may be played out with the same relative positioning to the left margin or be played out using the newly set tabs and margin setting. The newly set tab stop locations are defined as a fixed position relative to the print line and are independent of the left margin position or the position of the original tab stop location relative to the left margin.

The memory of the typewriter may be optionally updated when the document is played out using the second format tab stop locations, if the operator conditions the storage to accept changes during playout. Alternatively, the document may be played out using the second format tab stop locations, and the original format tab stop locations are maintained for future use.

4 Claims, 4 Drawing Sheets

TAB ADJUST FUNCTION FOR AN ELECTRONIC TYPEWRITER TO PERMIT THE SHIFTING OF TABS FROM A FIRST TO A SECOND FORMAT

FIELD OF THE INVENTION

The invention relates to the field of electronic typewriter features and more particularly to the function of adjusting the tab stop locations of a document from that format in which the document was entered or keyed to a second format where the tabs are placed differently from the original format.

BACKGROUND OF THE INVENTION

Electronic typewriters have always had the capability of storing operator designated tab stops to provide fixed locations relative to the page which the operator may quickly access through the use of the tabulation key on the keyboard. This storage of the tab stop location is typically in a segment of the memory which is designated the electronic tab rack or the electronic tab storage. The storing of the tab stop location in the electronic tab storage may take the form of a value which represents the distance onto the page along a horizontal writing line to the desired position. This distance is measurable from a base point. One such typical base point is the left limit of travel of the print point, usually defined by the left frame of the typewriter or other fixed obstruction to further leftward movement of the print carrier and the print point. An alternative approach is to store in the text memory a tab code and a value representative of the distance from the left margin to the tab stop. This value is derived from the print point position, the tab stop position in the electronic tab storage and the left margin position.

Both of these approaches are embodied in typewriters in the market presently, and each has advantages and disadvantages. The shortcoming of typewriters is that the typewriter is designed to use only one of the approaches, and the advantages of both systems cannot be had in the same typewriter. Particularly, a document which is entered or keyed and stored using one of these approaches cannot be played from storage using the other approach, without getting results that are either undesirable or unpredictable. Thus the ability to reformat a document is limited. For example, in a document created using one approach, margins cannot be easily changed since changing the margins will shift all tab stops that are based on the margin position.

This invention overcomes the problems of entering the document in a first format and then subsequently changing the tab stop layout.

SUMMARY OF THE INVENTION

When text is keyed into the typewriter, the typewriter operates in a mode where the depression of the tab key initiates a tab routine and the tab code is stored in the text data stream along with a numerical value. The numerical value is the distance from the left margin to the tab stop location. This then gives a destination value of the location. If the margins of the document are changed, then the tab stop location will shift relative to the page with the shift in the left margin location. However, if the tab adjust function is turned on, the destination value of the stored tab command is ignored and the next right tab position as stored in the electronic tab rack is determined and the tab command is executed using the tab location stored in the electronic tab rack as the control of the distance the print point is moved in the execution of the tab move.

A better understanding of the invention and its best mode of implementation may be had by referring to the drawings and the detailed description of the invention to follow.

DRAWINGS

DETAILED DESCRIPTION OF THE INVENTION

Figure 1:
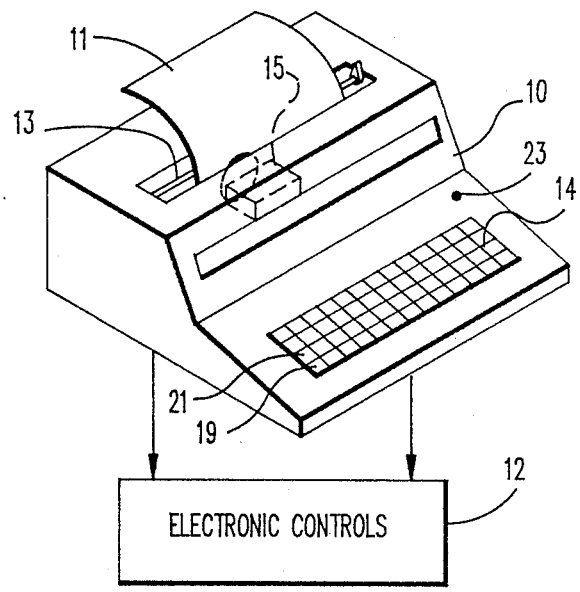
FIG. 1 is a block diagram of the electronic typewriter.

Referring to FIG. 1, the electronic typewriter 10 is illustrated with the electronic controls 12 shown as a block exterior to the typewriter 10. The electronic controls 12 receive electronic signals from the keyboard 14 and send electronic control signals to the typewriter 10 to cause it to perform the functions that have been designated at the keyboard 14, such as print a character, carriage return, tabulate, correct a character or line feed. Platen 13 supports record sheet 11 for movement in the line feed direction For a better understanding of the electronic controls 12, refer to FIG. 2. Electronic controls 12 are displayed as four blocks, a microprocessor 16, a Read Only Store 18, a random access memory (RAM) 35. An expanded depiction of RAM 35 is shown in FIG. 3, which includes text storage memory 37, a bank of status registers 44, 48 and an electronic tab memory or rack 46 all further as part of memory 35, and a system ASIC or Application Specific Integrated Circuit 20.

The microprocessor 16 may be any of a number of commercially available microprocessors. The preferred microprocessor, chosen for this description, is the Intel 8088. One skilled in the art will recognize that this is a general purpose microprocessor for which other processors may be substituted. The microprocessor 16 is controlled by supplying to it software instructions in the form specified by the manufacturer. These instructions constitute a control program which is stored in a suitable memory such as the Read Only Store 18. The Read Only Store memory 18 is loaded with the instructions at the time of its manufacture and contains the set of instructions necessary to make the typewriter 10 function as desired.

The system ASIC 20 is a set of standard AND, OR and other logic elements which may be customized as the manufacturer of the typewriter 10 desires, specifically in this device to scan the keyboard 14 and control the signals from the keyboard 14. The ASIC 20 also controls the interrupts to the processor 16 and captures the keyboard signals until they are used by the processor 16. Also the ASIC 20 controls the signals from the processor 16 and directs the processor output signals to a set of driver circuits 26 which convert the processor signals into signals that can be used to drive motors 22 and magnet 24. One of the motors 22 moves the print mechanism 15 while another is used to select the character for printing.

The specific combination of the discrete logic elements in the ASIC 20 is designed to provide a number of functions and signals. Some of the signals and functions provided are the keyboard scan to detect any newly depressed keys, interrupts of the processor 16 to cause the processor 16 to accept a signal and the timing of signals sent to the drivers 26 so that the motors 22 and magnet 24 of the typewriter 10 operate in the proper time frame and sequence.

The keyboard scan function, timer operation, interrupt operation and other functions of the ASIC 20 are all found essentially in commercially available keyboards or discrete components and perform the same operation. The ASIC 20 only serves to consolidate all such operations on a single chip and thus economize in space as well as cost.

Figure 2:
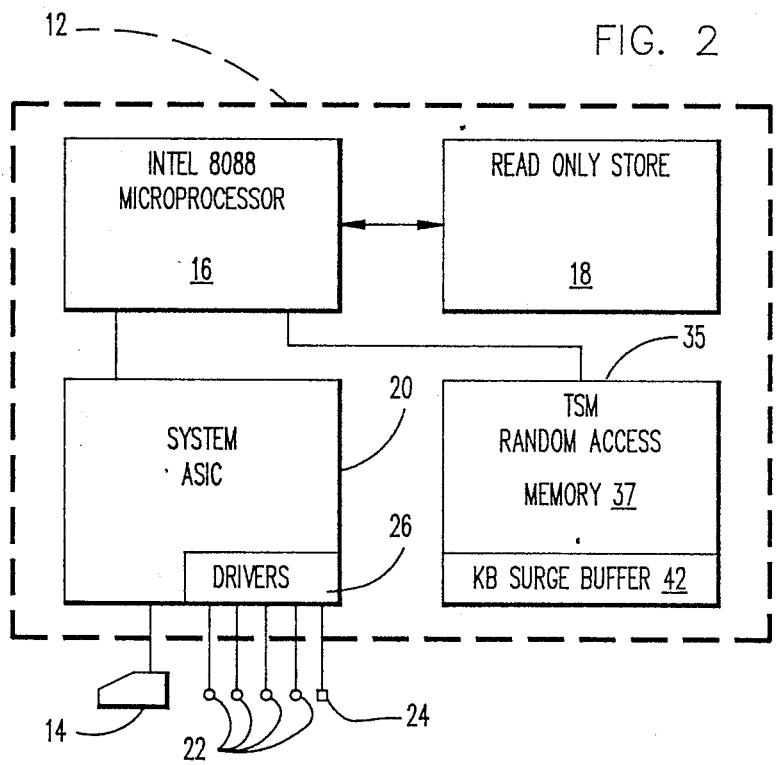
FIG. 2 is a block diagram of the electronic controls of the typewriter.
Figure 3:
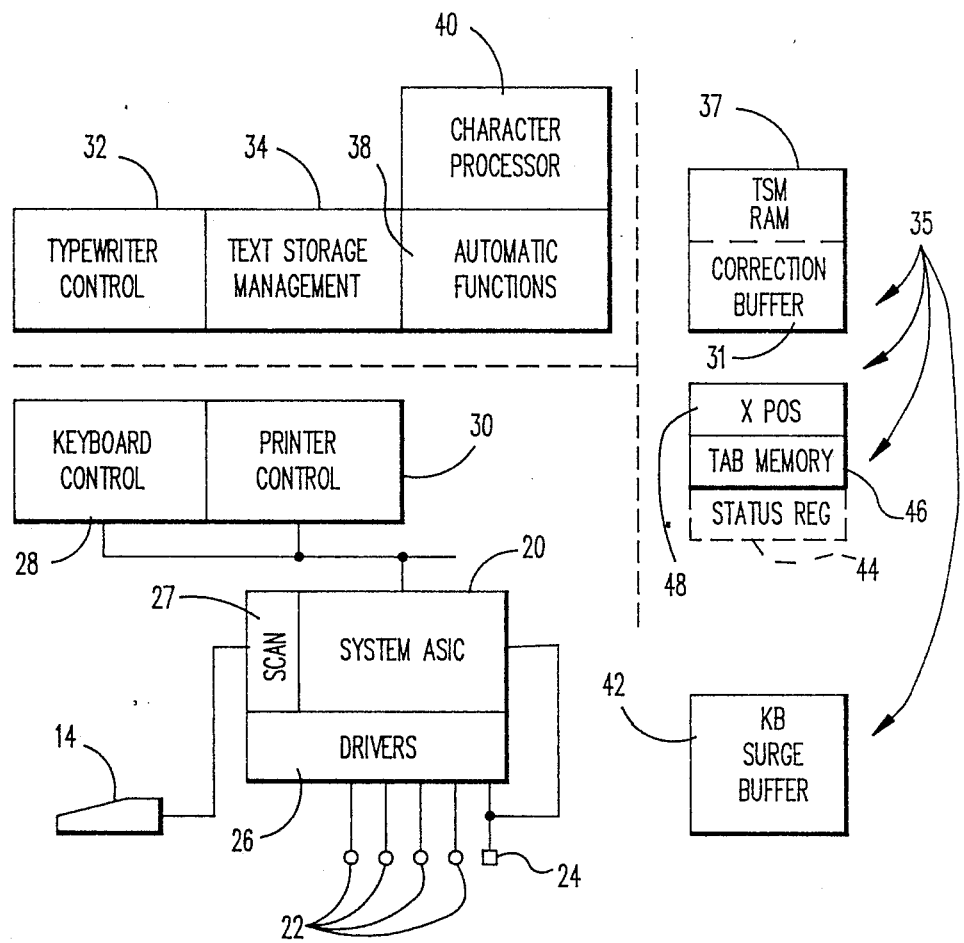
FIG. 3 is a block diagram of the functional relation of the microprocessor with the software and the keyboard, motors, magnet, and memories of the typewriter.

To further expand the description of the feature, FIG. 3 illustrates an expanded functional representation of the microprocessor 16 found in FIG. 2 and its associated software. The microprocessor 16 and associated software includes segments 32, 34, 38 and 40 and controls 28 and 30. The software may be prepared by any programmer of ordinary skill in the art and may take any number of forms, any of which will adequately perform the functions of controlling the typewriter 10.

The ASIC 20 of FIG. 2 is connected to the processor 16 and is responsive to the keyboard control segment 28 which is software interacting with the processor 16. The ASIC 20, scan section 27, scans the keyboard 14 and interrupts the microprocessor 16 when the ASIC 20 detects a key state change. The keyboard control segment 28 causes the storage of the keystrokes from the keyboard 14 in the keyboard surge buffer 42 until the typewriter control segment 32 is ready to work on the keyboard scan data.

The printer control segment 30 generates and sends the signals that are needed to operate the print mechanism 15 to the ASIC 20 so that the signals may be properly sequenced and timer controlled.

The typewriter control segment 32 serves to accept the keyboard data from the keyboard control segment 28 whenever the processor 16 is available to process textual data and acts to determine whether the keyboard data is representative of the alphanumeric symbols that are to be printed or, representative of the functions, that may be keyboard controlled. The typewriter control segment 32 utilizes the capabilities of the Keyboard Control segment 28 to retrieve the stored scan codes from the keyboard surge buffer 42.

To manipulate the text in TSM storage 37, a portion of Random Access Memory 35, and retrieve the text, the Text Storage management segment 34 (TSM) controls the storage of text and the necessary other codes that facilitate the efficient operation of the Random Access Memory 35. The TSM Random Access Memory 37 is the repository of the stored codes containing the text.

In order to perform functions automatically in response to keyboard commands, the Automatic Functions segment 38 is responsible for the controlling of those functions which are performed by the typewriter 10, and which are not character processing operations. The output signals of the Automatic Functions segment 38 pass to the printer control segment 30 where the signals are processed to generate the precise control signals necessary to control the motors 22 of the typewriter 10.

To identify, select and print characters and escape the print mechanism 15, along a line to be printed, the Character Processor segment 40 has the dedicated purpose of receiving those codes from the typewriter control segment 32 that represent the characters or other symbols that are to be printed on the record sheet 11. The Character Processor segment 40 receives a decoded scan output of the keyboard 14 and determines if it is printable in the desired location. The Character Processor segment 40 is also responsible for storing the character codes in a correction buffer 31 which is part of the TSM Random Access Memory 37.

The Character Processor segment 40 passes the printable character code to the Printer Control segment 30 which then, based on the data received, determines the specific motors 22, numbers of pulses, direction, and current levels to the motors 22 and magnet 24 that are required to properly print the symbol on the record sheet 11.

A keyboard surge buffer 42 is provided so that in the event that keyboard scan data is received by the system ASIC 20 at a higher rate than the system can or does utilize the key stroke scan data will not be lost to the keyboard control segment 28.

The illustration of the different segments 32, 34, 38, 40 of the operations are schematically illustrated as dedicated functional blocks of the processor 16 with the software instructions stored in the Read Only Storage 18 interacting with the processor 16 to perform the necessary data processing and produce the output signals required to control the typewriter 10 to either perform a function or to print a symbol at the desired location on the record sheet 11. Thus FIG. 3 is a functional diagram expressed in both hardware and a combination of hardware and software.

With this understanding of the operation of the typewriter 10, the tab adjust function will be described in conjunction with FIGS. 4 through 7.

The tab adjust feature may be implemented on any electronic typewriter which has memory sufficient to accept for storage, quantities of text that may be subsequently played out of the memory, to produce a printed copy.

The precise workings of the microprocessor 16 are not critical to understanding the invention since the flow diagrams of FIGS. 4 through 7 are general enough to provide a teaching relating to microprocessors in general, but sufficient to teach one of ordinary skill in the art the basis of the invention so it can be implemented on virtually any electronic typewriter with the adequate text storage.

Figure 4:
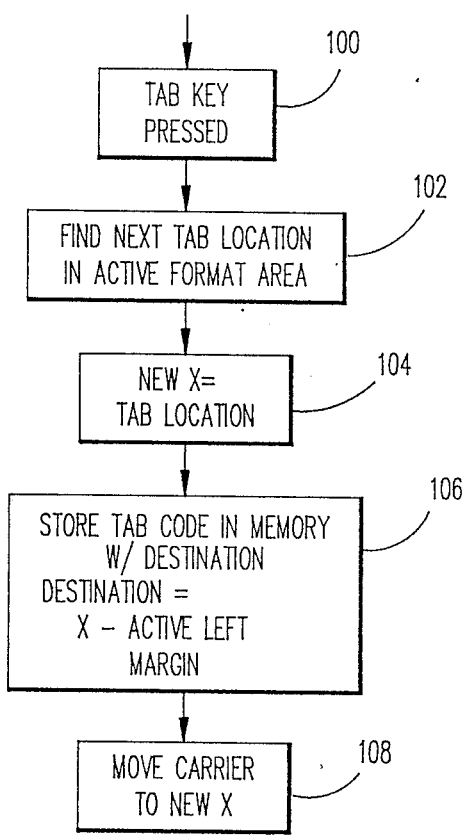
FIG. 4 is a flow diagram of the operator actions and operations performed by the electronic controls of the typewriter when the operator keys the text and tab commands.

All keying of the text into the typewriter 10 is accomplished by the use of the keyboard 14 and all tab commands are processed as described in reference to FIG. 4.

Referring now to FIG. 4. as the tab key 19 is depressed by the operator during typing of the text, at the time of original keying, in operation 100, the typewriter 10 is commanded to execute the tabulation command. The result is the microprocessor 16 searches thru the electronic tab rack 46 to determine the next rightmost tab stop setting within the active format area or working area between the left and right margins. This search for the next tab stop is in operation 102. During this operation the operator may store the text as keyed in the TSM 37 by commanding the processor 16 to open storage and place the keyed codes in the TSM 37.

The value stored in the electronic tab rack 46 is a distance measured along the writing line of the typewriter 10 to the point at which the print point will reside after the tab operation is complete.

The next tab location is designated as the new X or the new X location, in operation 104. The new X location is stored in the status register 44, in operation 106, and used by the microprocessor 16 to control, through the printer control segment 30, the movement of the print point to the new tab position in operation 108.

After the new X location is stored in operation 104, the tab code is stored in the TSM 37 in the form of a tab command code and immediately followed by a destination value. The destination value is the numerical representation of the distance along the writing line of the tab stop location less the distance of the left margin along the writing line from the leftmost possible position of print mechanism 15. In other words, the destination value is relative to the left margin. This calculation and storage of the destination value is accomplished in operation 106.

Thereafter, the print mechanism 15 and the print point are moved to the new X location on the writing line, by the printer control segment action through the ASIC 20 and the motors 22. This movement and how it is accomplished is well known and conventional in electronic typewriters and does not form a part of the novelty of the invention.

It can be seen from FIG. 4 and the related description that when a tab operation is commanded from the keyboard 14 the next sequential tab stop is selected and the distance from the left margin is, calculated and that value is stored in the memory 37, and then the tab move is executed.

The tab adjust function is an operator invokable function and is not operable at all times. In order for the operator to invoke the function, the keyboard 14 is provided with a tab adjust key 21 which is used to turn the function on and off. Alternative controls may be used such as a switch, a code key and alphanumeric key combination, or other technique, all not shown. The type of input control device is not critical to the invention.

Figure 5:
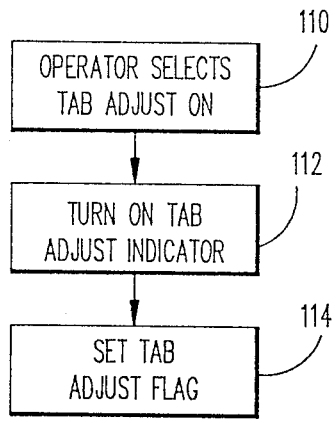
FIGS. 5 and 6 are flow diagrams illustrating the operator actions and operations of the electronic controls of the typewriter during the enablement and disablement of the tab adjust function.
Figure 6:
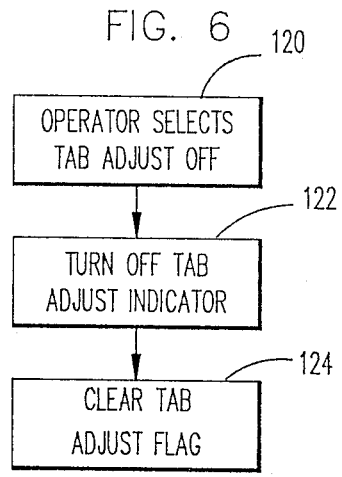

FIGS. 5 and 6 illustrate the flow of the control in turning on and off the function. The operator invokes the function in operation 110. This is done by the depression of tab adjust key 21 or similar input, and the tab adjust indicator 23 is turned on by the microprocessor 16, in operation 112, to indicate to the operator that the tab adjust function is active. This indicator may be a light 23 or other device visible or audible to the operator.

The typewriter control then sets a tab adjust flag in one of the status registers 44, in operation 114, so that when the microprocessor 16 detects a tab command stored in the text data stream in TSM 37, the appropriate function will be performed.

Similarly in FIG. 6, the operator may activate the tab adjust key 21 to turn off the function, in operation 120. The typewriter control segment 32 of the microprocessor 16 then turns off the tab adjust indicator 23 in operation 122, and the previously set flag in the status register 44 is cleared in operation 124, so that the microprocessor 16 will be able to determine that the function is deactivated.

Electronic typewriters that have a storage memory for text have a playout routine in the software which permits the operator to retrieve text from the memory and to print the text out on the typewriter. Playout routines are well known and conventional in electronic typewriters.

Figure 7:
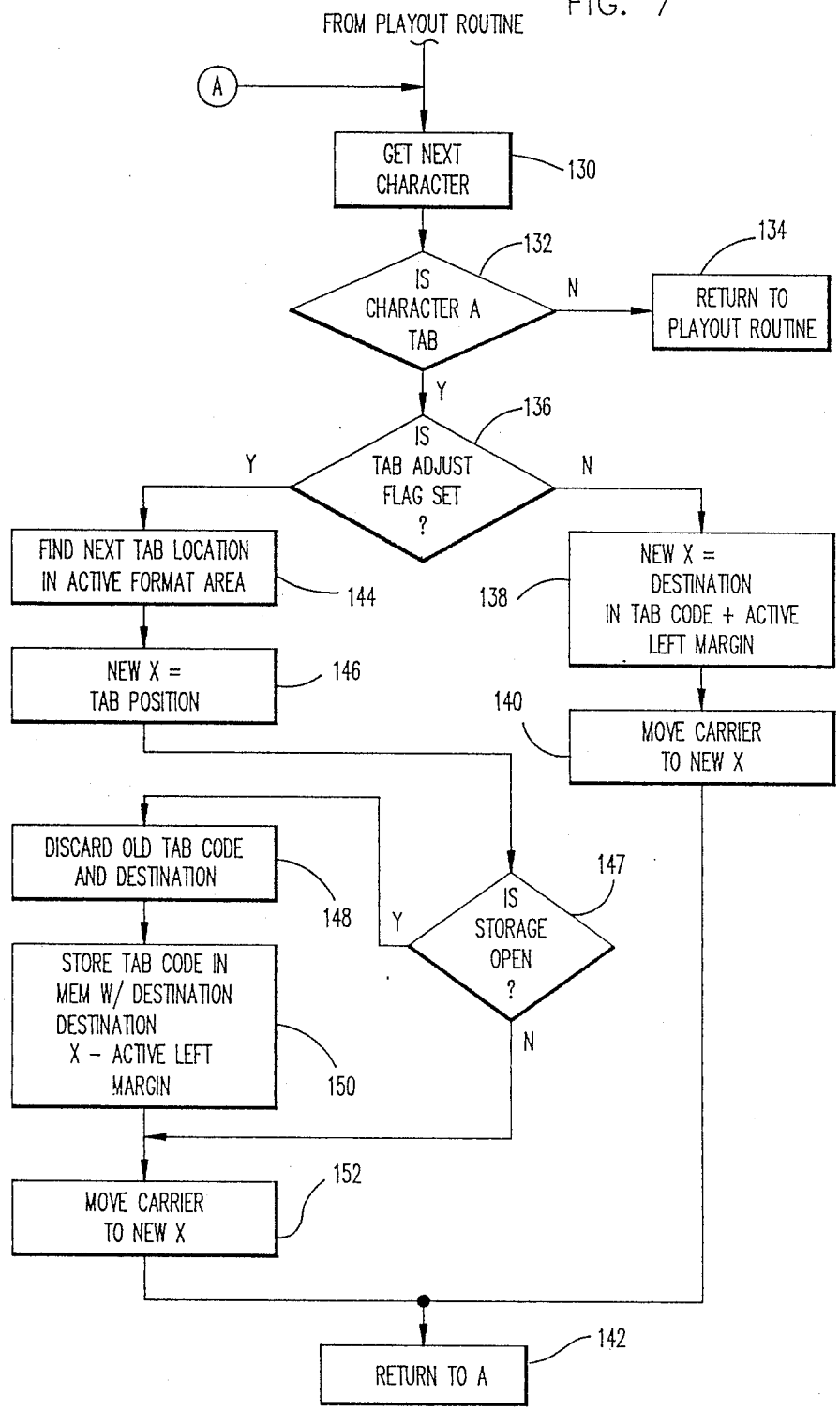
FIG. 7 is a flow diagram of the operations performed by the electronic controls of the typewriter during the playout of previously recorded text.

The description of the operations in FIG. 7 assumes that the text has been previously recorded and stored in TSM 37. The operator then may play out the stored text with or without the use of the tab adjust function. FIG. 7 is a routine which accommodates the operator selection during playout and is a routine that may be inserted into a playout routine, such as that found in typewriters such as the IBM WHEELWRITER 6 Typewriter manufactured by the International Business Machines Corporation, Armonk, New York.

In operation 130, the next sequential character code in the TSM 37 is retrieved by the Text Storage Management segment 34. The typewriter control segment 32 then decodes the retrieved data code to determine if the code represents a tab command. If the code does not represent a tab command, then the flow branches at operation 132 through the negative path to operation 134 which represents the return of the operational control to the typewriter's playout routine, and the typewriter 10 will continue processing and retrieving codes from the TSM RAM 37 to playout the text.

If, on the other hand, the determination is made in operation 132 that the just retrieved code is a tab command, then the flow branches along the affirmative path to operation 136 where the status register 44 is polled to determine if the tab adjust flag is set or reset. If the tab adjust flag is reset, then the tab adjust function is off or disabled, and the tab functions will be executed in the conventional destination tab manner. This is exemplified by the negative branch from operation 136 to operation 138.

In operation 138, the new X or the tab stop location on the writing line is determined from the destination value stored with the tab code. The destination value is added to the position value of the active left margin. Active left margin means the left margin or if an indented left margin is being used at the time, the indented margin is the basis for the tab stop position on the writing line. Future reference to the left margin is understood to mean the active left margin.

After the new X location is determined, the X location is used to control the movement of the print point to the tab stop position, in a known conventional manner by issuing commands to the motors 22 to effect escapement of the print point to the tab stop location in operation 140.

After the tab movement is completed, the flow passes to operation 142 where the flow is looped to the point in the flow path just prior to operation 130.

It is understood from the foregoing description that when the tab adjust function is turned off, the typewriter control segment 32 causes the print mechanism 15 and the print point of the typewriter 10 to translate the tab stop location which is the same distance from the left margin as the tab stop was at the time the text was initially keyed. There is no movement of the tab stop positions relative to the left margin.

Referring back now to operation 136, if the tab adjust flag is set indicating that the tab adjust function is turned on, the flow branches along the affirmative branch to operation 144 where in response to the code being a tab command, the next rightmost tab location is determined and retrieved from the tab rack 46, and the retrieved tab position becomes the new X location, and in operation 146 it is stored in the X position register 48.

After operation 146, a determination is made as to whether text storage is open, in operation 147.

Some electronic typewriters store text in the memory only when the storage is opened or enabled and if the typewriter is of that type, then there are two modes of operation. The first mode of operation is with storage closed. In a closed storage mode, the flow from operation 147 is to operation 152, thus operations 148 and 150 are either branched around or they are ineffective since the memory 37 is not alterable and the old tab code may not be deleted or overwritten with a new tab code including a new destination value. In this mode, no alterations to the stored text occurs. The second mode is with storage open, and in this mode, the text stored in the TSM RAM 37 may be altered to reflect changes that occur during playout.

If the determination in operation 147 is affirmative, then the old tab code in the data stream retrieved from the TSM 37 is discarded in operation 148. In operation 150, the new tab code with the new destination value is stored in the TSM 37 as a replacement for the old tab code, thus updating the TSM 37 contents to reflect the latest format for the document. The new destination value is determined by subtracting the left margin value from the new X location value. Using the new X value stored in the X Position register 48, the carrier is moved to the new X location, using the printer control segment 30, in a known and conventional manner.

Thereupon, the flow is to operation 142, and looped back to operation 130 as previously described.

With the foregoing description and understanding, an example will be described to better enable one to understand how the invention works.

The operator keys and stores text without regard to whether the tab adjust function is activated or not. The tab codes are stored in the text code stream and include a destination value which is relative to the left margin.

At the time of playout of the stored text, the operator may activate or deactivate the tab adjust function by depressing tab adjust key 21. Also the operator may change the location of the left margin and tab stops. In fact, such changes may occur during the playout by stopping the playout and making changes in the middle of the text.

During the course of this example, assume that the text was keyed using a left margin of 15 and tabs set at 30, 45 and 60. At the time of playout of the stored text, the left margin is reset to 10 and the tabs reset to 20, 30 and 45.

If the operator turns off the tab adjust function, as text is played out of TSM 37 and a tab command is encountered, the destination value which was stored with the tab command code controls and since it is relative to the left margin, the tab stops are shifted relative to the print line five spaces to the left but retains the relative spatial relationship to the left margin.

If, on the other hand, the tab adjust function is activated, the text is played out until a tab stop is encountered in the text data stream. At this time, the tab code is recognized and the destination value is effectively ignored and the location of the tab stop is determined by the value of the tab stop location as stored in the electronic tab rack 46. If storage is opened, the new tab position in the form of a new destination value is stored, replacing the discarded old destination value. Thus the stored document is updated in memory 37. If the storage is not open, then the destination value is unaffected in storage. The playout will be the adjusted tab positions, but the original format is retained in TAB memory 46, for future use.

Following through on the example, if the text is played out with the function of tab adjust activated, the tab positions will be shifted to print line positions 20, 30 and 45 and the destination values used to position the tab stop positions will be computed, utilized and stored, if storage is open, relative to the left margin value of 10.

This function allows a document that is keyed and stored using one set of format positions to be played out and have the tab stop positions shifted to new specified positions relative to the page and not relative to the left margin, effectively reformatting the text to the new layout on the page. At the same time the typewriter 10 is capable of producing a typed or printed copy of the text with the format as entered, with a lateral shift of the copy only relative to the positioning of the left margin.

The best mode for this invention as well as the preferred embodiment is to implement the invention in an electronic typewriter using a series of program instructions and utilizing the microprocessor of the typewriter. The foregoing description, flow diagrams and block diagrams provide an embodiment of the invention which teaches one of skill in the art how to implement the invention using program instructions on any suitable electronic typewriter.

We claim:

1. An electronic typewriter with a tab adjust function, said typewriter comprising a keyboard for inputting characters and commands; a platen for supporting a record sheet; a print mechanism for forming marks on said record sheet responsive to said keyboard; an escapement means for moving said print mechanism parallel to said platen in at least a left to right direction; electronic control means for controlling said escapement means; memory means; means for storing in and retrieving from said memory means text and command codes entered through said keyboard;

said electronic control means comprising means for storing an operator designated left margin location and means for storing operator designated tab stop locations and means for retrieving a selected one of said tab stop locations responsive to a tab code generated by a predesignated key on said keyboard being actuated;

means for determining a value representative of a distance from said left margin to said selected tab stop location;

means for storing said value with said stored text and command codes, in response to operator actuation of said predesignated key;

means for retrieving said stored command codes and value in conjunction with retrieving said stored text;

first means responsive to a retrieved command code and said value for determining a distance to be traversed by said print mechanism to place said print mechanism at said selected tab stop location;

said electronic control means further comprising a second means responsive to said retrieved command code for causing said means for retrieving a selected one of said tab stop locations to retrieve said selected one of said tab stop locations and means for determining a distance to be traversed in response to said retrieved tab stop location;

said electronic control means responsive to said stored command codes and said value for controlling said escapement means to move said print mechanism to said selected one of said tab stop locations; and operator selectable means for enabling one of said first and said second means during retrieval of said stored text and command codes; thereby causing tab stop locations, relative to said left margin, stored in a first format to be used as stored or overridden by tab stop locations stored and used in a second format, depending upon the operator enablement of said first means or said second means.

2. The typewriter of claim 1 further comprising means to control the ability of said means for storing said text and command codes to store and inhibit storing, and means for changing said value in memory to correspond to said retrieved selected one of said tab stop locations, when said second means is selected during said retrieval of said stored text and command codes.

3. An electronic typewriter comprising a keyboard, print means, memory means, electronic controls responsive to said keyboard for storing in and retrieving codes from said memory means representing text and commands and for controlling said print means to print and to move said print means along a line, in at least a left to right direction, said electronic controls comprising tab control means, said tab control means including a first tab means for storing a plurality of operator selectable tab stop locations, means for retrieving a selected one of said tab stop locations in response to commands from said keyboard, means for determining a destination distance from a left margin location to said selected one of said tab stop locations, means for storing in said memory means said commands from said keyboard and said destination distance, means for determining a distance to be traversed by said print means, and means for controlling said print means to move said print means said distance to be traversed, to position said print means over said selected one of said tab stop locations;

said tab control means further comprising a second tab means for responding to said commands stored in said memory means and said destination distance to move said print means to said selected one of said tab stop locations;

said tab control means further comprising a third tab means for responding to said commands stored in said memory means and for not responding to said destination distance, and for retrieving a selected one of said tab stop locations in response to said retrieved commands from said memory means, means for determining said destination distance from said left margin location and for determining said distance to be traversed by said print means, and means responsive to said distance to be traversed for controlling said print means to move said print means said distance to be traversed;

and means for selecting the operation of one of said second and said third tab means during the retrieval of said stored codes and commands.

4. The typewriter of claim 3 further comprising means to control the ability to store said codes to store in said memory means and inhibit storage, and means for changing said destination distance in memory to correspond to said retrieved selected one of said tab stop locations, when said third tab means is selected during said retrieval of said stored codes and commands.

* * * * *